Jan. 19, 1932.   W. J. SNOW   1,842,126
FLUID FUEL CONTROL SYSTEM
Filed July 19, 1926   2 Sheets-Sheet 2

Inventor
Wallace J. Snow
By Edmund J. DePue
Attorney

Patented Jan. 19, 1932

1,842,126

UNITED STATES PATENT OFFICE

WALLACE J. SNOW, OF LAKEWOOD, OHIO, ASSIGNOR, BY MESNE ASSIGNMENTS, TO THE CLEVELAND HEATER COMPANY, OF CLEVELAND, OHIO, A CORPORATION OF OHIO

FLUID FUEL CONTROL SYSTEM

Application filed July 19, 1926. Serial No. 123,561.

This invention relates to improvements in liquid heaters using fluid fuel and particularly automatic fuel controlling mechanism for such heaters. It has for its primary objects the provision of a combined thermostatic and thermally actuated controlling means in which the number of parts are reduced to a minimum and a compact arrangement secured; and the provision of controlling means in which the thermostatic and thermally actuated means are so associated that the gas flow to the burners is controlled in a positive, safe, and reliable manner.

Certain embodiments of the invention are illustrated in the accompanying set of drawings wherein—

Figure 1:
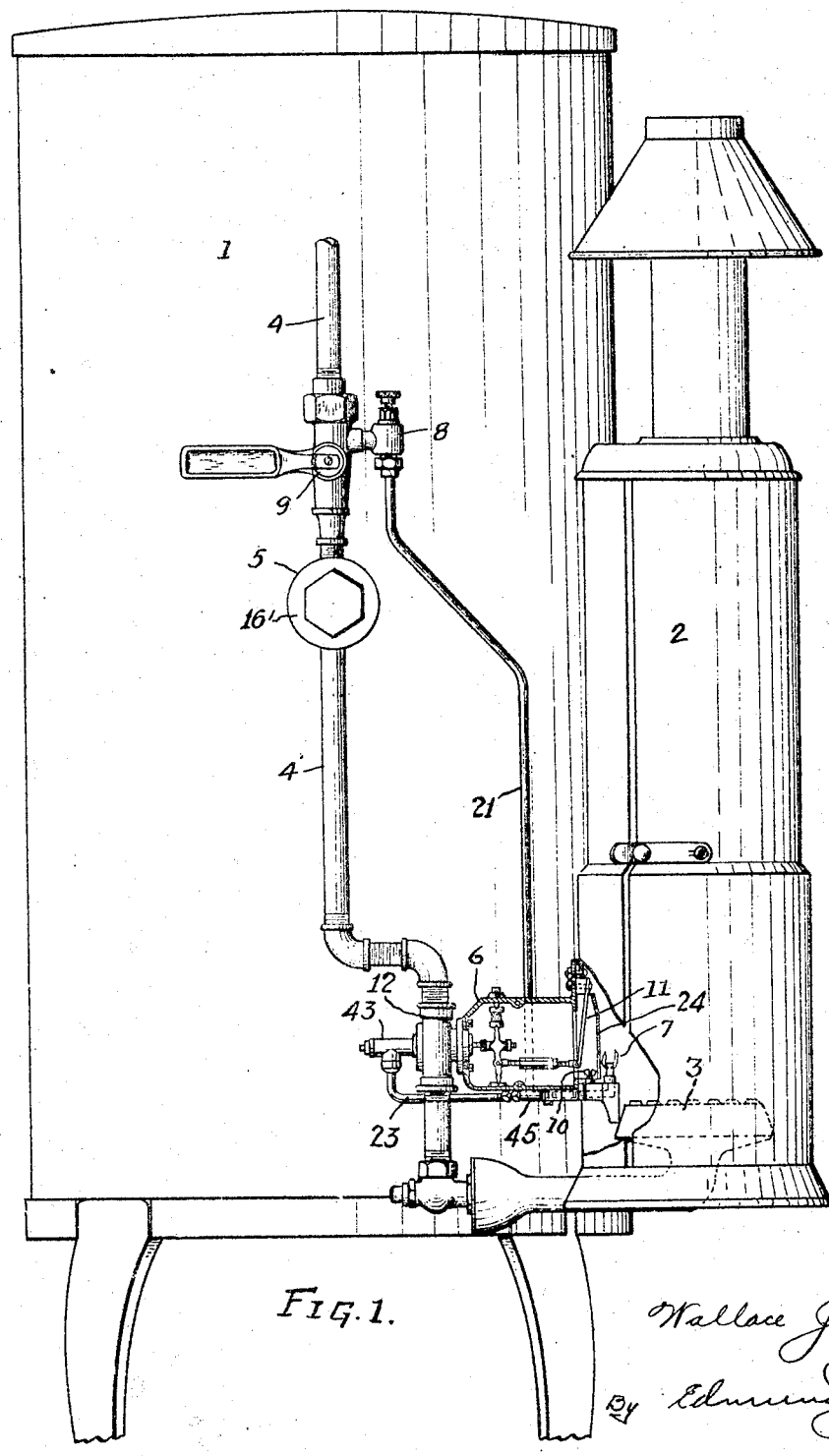
Fig. 1 is a side elevation of a storage automatic heater embodying my invention.

In the application of my invention shown in Fig. 1, the numeral 1 indicates a storage water tank, the water of which is heated in the usual manner by a gaseous fuel burner 3, furnishing heat for water circulating elements of the usual type housed in the casing 2. Gaseous fuel is supplied by a main fuel line 4.

The burner control system in this device includes a thermostatic valve 5, and a thermally actuated valve 6. A constantly burning pilot 7, is positioned adjacent the thermally actuated valve. Gas to this pilot is supplied by the line 21, controlled by the needle valve 8. A manually operable valve 9, is located in the gas line between the needle valve 8, and the thermostatic valve 5. An intermittently burning, or auxiliary burner 10, is positioned between the constantly burning pilot 7, and the thermally actuated valve 6. Gas to the burner 10 is controlled, in the present case, by the thermostatic valve 5 and the thermally actuated valve 6 in a manner to be described in detail presently.

Figure 2:
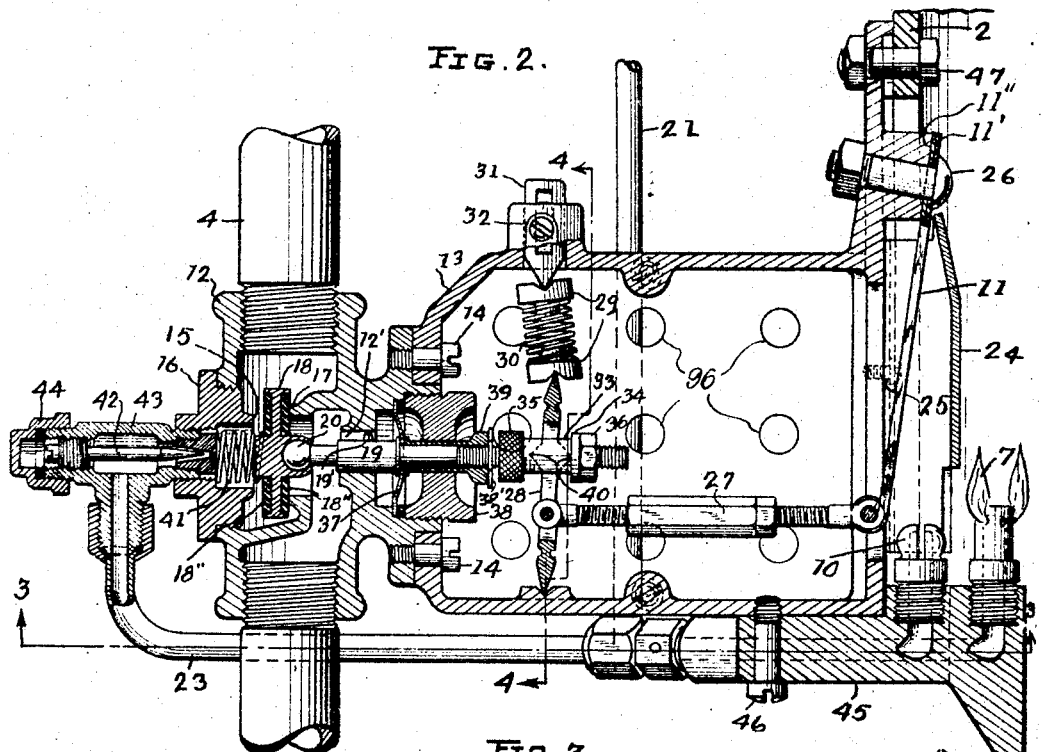
Fig. 2 is an elevation in section of the thermally actuated valve.
Figure 3:
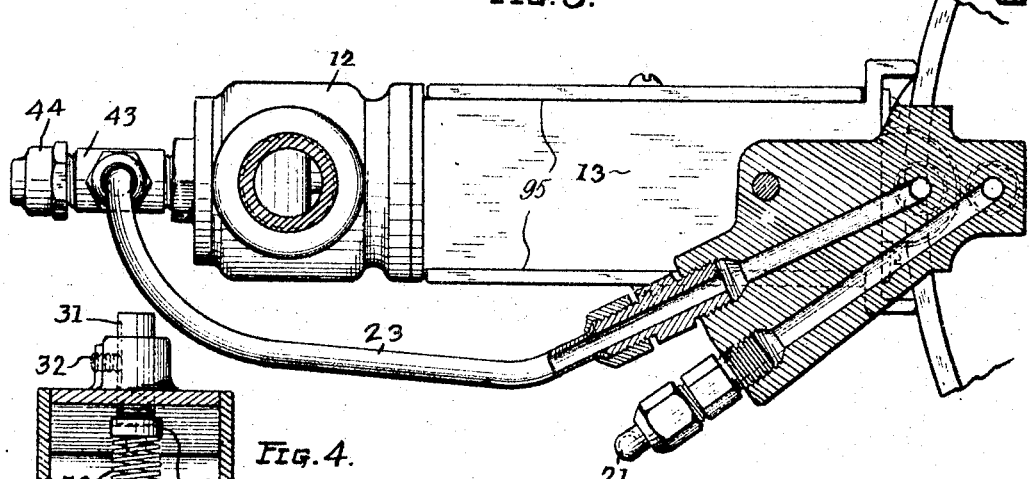
Fig. 3 is a section taken on line 3—3, Fig. 2.
Figure 4:
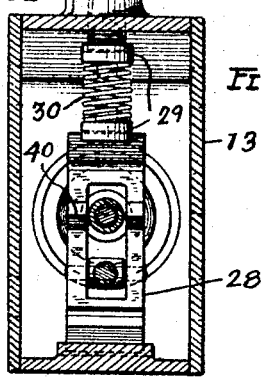
Fig. 4 is a section taken on line 4—4, Fig. 2.

The thermally actuated valve 6, is shown in detail in the enlarged sectional view Fig. 2. This valve consists of a valve casing 12, provided with inlet and outlet connections, and having a valve seat 17, formed integrally therein, and having a removable valve seat 15, threadedly engaged in said casing, opposite to and in axial alignment with the first named valve seat. A disc shaped valve head 18, faced on each side with a yielding material 18″, such as leather, co-acts with the valve seats 17 and 15 to control the flow of fluid through the passages controlled thereby. The valve head 18 is mounted upon a valve stem 19 by means of a ball and socket joint 20, allowing the valve head to adjust itself to its seat. The valve casing 12, is mounted upon a valve housing 13, by means of screws 14. The auxiliary burner 10, is adapted to heat a bimetallic thermally responsive element 11 which is located in a housing formed in part by the shield 24 which is secured to the housing 13 by the screw 25. As shown in Fig. 2 the housing 13 is provided with covers 95 having apertures 96 for the purpose of supplying cooling air to the thermostatic strip 11. The air thus supplied is directed against the strip 11 and drawn into the interior of the heater 2 by way of the openings provided above and below the shield 24. By this arrangement heat from the main burner 3 or the pilot burner 7 is prevented from effecting the operation of the thermostatic strip 11, and upon the extinguishment of the burner 10, the strip 11 cools and shifts the valve to its closed position. This thermal element is of the usual construction and is made, in the present instance, by bonding or welding a strip of metal 11′ having a high co-efficient expansion, such as Monel metal or brass, to a strip of metal 11″ having a low coefficient of expansion such as Invar or 36% nickel steel. By reason of the differential expansion of the two different metals of which the strip 11 is made, power is furnished to actuate the valve mechanism. One end of the thermal element is secured to the housing 13, by means of a bolt 26. The free end of the thermal element is pivotally connected to an oscillating lever 27, which is in turn pivotally connected to an oscillating lever 28. A resilient lever comprising the elements 29 and spring 30 bears against the adjustable pin 31 and the oscillating lever 28 to urge it to the end of the arc of its travel. The adjustable pin 31 is held in position by the set screw 32. The lever 28, has a cut-out portion through which the valve stem 19 projects. The lever 28 is provided with contacting edges 40, to engage with the annular flanges 34 and 35 of the internally threaded sleeve 33 which is held in position on the valve stem 19 by means of a lock nut 36. Diaphragm packing means 37 are clamped about the valve stem 19, by a lock nut 39′ and bearing element 39 journaled in the threaded plug 38 which holds the diaphragm in fluid tight engagement with a bored out portion of the casing 12. The element 16 having the valve seat 15 formed upon its inner face provides an abutment for the spring 41. A needle valve casing 43 is screwed into the outer end of this spring abutment. The valve includes an adjustment needle 42 and the closure cap 44. A gas feed pipe 23 leads from this valve to the burner 10. Rotation of the valve stem is prevented by means of a lug 19′ on the valve stem 19 longitudinally movable in the slot 12′.

The operation of the valve shown in Fig. 2 is substantially as follows: Assuming the parts to be in the position shown in Fig. 2 gas is admitted to the valve by way of the conduit 4, passes into the adjustment valve casing 43 by way of the uncovered valve seat 15 and thence to the conduit 23 and burner 10 where it is ignited by the constantly burning pilot 7. The flame from the burner 10 heats the bimetallic strip 11 causing it to warp to the left and to move the lever 28 just past its dead center position when its edge 40 then makes contact with the annular projection 35 and the spring 30 snaps the valve and its associated mechanism to the extreme left or open position. This action covers the valve seat 15 and uncovers the seat 17 permitting gaseous fuel in the present instance to pass by way of conduit 4′ to the main burners where it is ignited by the pilot flame 7. The extinguishment of the flame of the auxiliary burner 10 by the closure of the valve seat 15 allows the strip 11 to gradually cool and in so doing the link 27 and lever 28 are shifted to the right. The spring 41 now causes the valve head 18 and rod 19 to follow the movement of the oscillating lever and provides a regulating valve with the seat 15. In this manner a regulated flow of gas is admitted to the burner 10 sufficient to hold the valve open without over-heating the strip 11 as long as gas is admitted to it. The action of this valve is upon opening, to press the valve head 18 against the seat 15 cutting off the supply of gas to the burner 10. The strip 11 then cools, shifting to the right and permitting the spring 41 to push the valve head 18 away from the seat 15 admitting fuel to the burner 10. In practice it has been observed that during the time of operation of the valve, that is when gas is being admitted to the main burner, the burner 10 has a tiny flame of about ⅛ of an inch in height. Upon cutting off the supply of gas to the thermally actuated valve, the flame from the burner 10 is extinguished and the strip 11 cools and closes the valve. The pilot flame 7 is normally adjusted so that its heat is insufficient to effect the operation of the strip 11. Adjustment of the valve is provided for at three places. Raising or lowering the pin 31 determines the tension in the spring 30 which governs the force required to shift the valve to open or closed position affecting both these shifts in the same manner as for example, increasing the tension in the spring would cause the valve to take a longer time to open as well as a longer time to close. The contacting edges 40 of the lever 28 have a limited amount of free play between the annular flanges 34 and 35. This free movement allows the oscillating lever to have just passed its dead center position before it starts to open the valve and by using the energy stored in the spring 30 the lever and valve are quickly shifted to open position with what is commonly called a snap action.

In order to take care of the wear of the valve parts and inaccuracies in machining, the sleeve 33 with its annular projections 34 and 35 are adjustably mounted on the valve stem 19 and locked at the proper setting by the nut 36. The relative length of time to open and close the valve can be varied by the adjustable link 27. Lengthening the link will give a quick opening and a slow closing valve and shortening the link will lengthen the time required for opening and shorten the time required for closing. Attention is directed to the fact that when properly adjusted the valve provides a snap-acting valve with the seat 17 and a regulating valve with the seat 15. In order to take care of different gas pressures a needle valve 42 is provided whereby the height of the flame from the burner 10 is controlled and regulated. The thermostatic valve 5 may be of any suitable type adapted to extend into the tank 1 and be responsive to the temperature of the fluid within the tank.

It is apparent from the foregoing description that a battery of burners may be controlled by one or more devices of the present invention. It is to be noted that in the operation of my device the presence of a burner ignition pilot flame is necessary before it is possible to admit gas to the main burners, obviating the danger of having unburned gas issue from such burners.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

I claim:

1. In a fluid fuel fired heating appliance the combination of a continuously operating pilot burner, a main burner and an auxiliary burner positioned to be ignited thereby, a source of fluid fuel supply, a thermally actuated valve in communication therewith for controlling the fuel supply of said main burner, a thermostatic actuator for said valve directly exposed to the heat of said auxiliary burner, means to direct a supply of cooling air to said thermostatic actuator, means to shield said thermostatic actuator from the heat emitted from said main burner and said pilot burner, a fuel supply line communicating with said source of fuel supply at a point ahead of said thermally actuated valve for conducting fuel around said valve to said auxiliary burner, and valve means in said fuel supply line for controlling the operation of said auxiliary burner whereby when said valve means is in open valve position gas is supplied to said auxiliary burner maintaining said thermally actuated valve in open position for the purpose of supplying gas to said main burner, and when said valve means is closed said auxiliary burner is extinguished allowing said thermally actuated valve to close and cut off the fuel supply of said main burner.

2. In a fluid fuel fired heating appliance the combination of a continuously operated pilot burner, a main burner and an auxiliary burner positioned to be ignited thereby, a source of fluid fuel supply, a thermally actuated valve in communication therewith for controlling the fuel supply of said main burner, a thermostatic actuator for said valve directly exposed to the heat of said auxiliary burner, a shield for concentrating the heat of said auxiliary burner onto said thermostatic actuator and for shielding it from the heat of said main burner and said pilot burner, a fuel supply line communicating with said source of fuel supply at a point ahead of said thermally actuated valve for conducting fuel around said valve to said auxiliary burner, and valve means in said fuel supply line for controlling the operation of said auxiliary burner whereby when said valve means is in open valve position gas is supplied to said auxiliary burner maintaining said thermally actuated valve in open position for the purpose of supplying gas to said main burner, and when said valve means is closed said auxiliary burner is extinguished allowing said termally actuated valve to close and cut off the fuel supply of said main burner.

3. In a fluid fuel fired heating appliance the combination of a continuously operated pilot burner, a main burner and an auxiliary burner positioned to be ignited thereby, a source of fluid fuel supply, a thermally actuated valve in communication therewith for controlling the fuel supply of said main burner, a thermostatic actuator for said valve burner directly exposed to the heat of said auxiliary burner, means to shield said thermostatic actuator from the heat emitted by said main burner and said pilot burner, a fuel supply line communicating with said source of fuel supply at a point ahead of said thermally actuated valve for conducting fuel around said valve to said auxiliary burner, and valve means in said fuel supply line for controlling the operation of said auxiliary burner whereby when said valve means is in open valve position gas is supplied to said auxiliary burner maintaining said thermally actuated valve in open position for the purpose of supplying gas to said main burner, and when said valve means is closed said auxiliary burner is extinguished allowing said thermally actuated valve to close and cut off the fuel supply of said main burner.

4. In a thermostatic valve, a constantly burning pilot burner, an auxiliary pilot burner, a thermostatic element adjacent to said auxiliary pilot burner, an adjustable link connected to said element, snap action mechanism operatively engaged by said link, a valve stem controlled by said snap action mechanism and loosely coupled therewith, a valve head carried by said valve stem, resilient means to oppose the movement of said valve head in one direction whereby said valve head directly follows the movement of said thermostatic element over a portion of its travel, and a valve body having a valve port controlled by said valve head.

5. In a thermostatic valve, a constantly burning pilot burner, an auxiliary pilot burner, a thermostatic element adjacent to said auxiliary pilot burner, an adjustable link connected to said element, snap action mechanism operatively engaged by said link, a valve stem controlled by said snap action mechanism and loosely coupled therewith, a valve head carried by said valve stem, resilient means adapted by reason of said loosely coupled valve stem to urge said valve head towards said thermostatic element to directly follow the movement thereof after said element has moved sufficiently to take up the lost motion provided by the loosely coupled connection between said valve stem and said snap action mechanism, and a valve body having a valve port controlled by said valve head.

6. In a safety control and ignition system for gas burning appliances having a main heating burner, a thermostatic gas valve comprising a thermostatic element, a burner positioned to supply heat to said element for the operation of said valve, a valve body having a pair of axially aligned valve ports one of which communicates with said burner and the other of which communicates with said main burner, a valve head operatively associated with said thermostatic element and positioned between said valve ports and resilient means cooperating with said valve head and said thermostatic element to regulate the flow of fuel from the valve ports communicating with said burner to maintain said thermostatic element within predetermined limits of temperature when the other of said valve ports is uncovered by said valve head.

7. A thermostatic valve comprising a thermostatic element, snap action mechanism, an adjustable link connecting said element to said mechanism, means to vary the force of the throw of said snap action mechanism, a valve head, a valve stem for said valve head, an adjustable spool providing a lost-motion connection between said valve stem and said snap action mechanism, a valve body having a pair of axially aligned valve seats controlled by said valve head and means to urge said valve head away from one of said valve seats.

8. A thermostatic valve comprising a thermostatic element, snap action mechanism, an adjustable link connecting said element to said mechanism, means to vary the force of the throw of said snap action mechanism, a valve head, a valve stem for said valve head, an adjustable spool providing a lost motion connection between said valve stem and said snap action mechanism, a valve body having a pair of axially aligned valve seats controlled by said valve head and means to urge said valve head toward one of said valve seats.

9. A thermostatic valve comprising a thermostatic element, snap action mechanism, an adjustable link connecting said element to said mechanism, means to vary the force of the throw of said snap action mechanism, a valve head, a valve stem for said valve head, an adjustable spool providing a lost motion connection between said valve stem and said snap action mechanism, a valve body having a pair of axially aligned valve seats controlled by said valve head and means to maintain said spool in contact with said snap action mechanism through a portion of the movement of said snap action mechanism.

10. A main and an auxiliary burner in combination with a thermally actuated valve comprising, a body having an outlet port for each of said burners, valve means for opening and closing said outlet ports, resilient means urging said valve means to closed position with respect to the port for said main burner, and thermostatic actuating means for said valve means responsive to the heat produced by said auxiliary burner and acting in opposition to said resilient means to provide a thermostatic fuel regulator for said auxiliary burner.

11. A main and an auxiliary burner in combination with a thermally actuated valve comprising, a body having an outlet port for each of said burners and oppositely disposed to each other, a thermostatic actuator responsive to the heat emitted by said auxiliary burner, a valve head associated therewith operatively positioned between the ports of said body, and resilient means acting in opposition to said actuator to urge said head toward the main burner port, said valve head permitting a substantially free flow of fuel to said main burner and at the same time regulating the flow of fuel to said auxiliary burner in accordance with the temperature conditions of said thermostatic actuator.

12. A main and an auxiliary burner in combination with a thermally actuated valve comprising, a body having an outlet port communicating with said main burner and a second outlet port communicating with said auxiliary burner, thermostatic actuating means responsive to the heat emitted by said auxiliary burner, resilient means acting in opposition to said thermostatic actuating means, and a valve means associated with said actuating means and said ports to provide a thermostatic fuel regulator for said auxiliary burner and a thermostatic fuel cut-off for said main burner.

13. In a safety control and ignition system for gas burning appliances having a main heating burner and a constantly burning ignition pilot in lighting proximity thereto, a valve for controlling the supply of fuel to said main heating burner, a housing for said valve, heat responsive means for actuating said valve, an auxiliary burner positioned between said ignition pilot and said means for actuating said valve to heat said means, said auxiliary burner being in communication with said housing and positioned to be ignited by said ignition pilot, and means cooperating with said valve during actuation thereof by said heat responsive means for increasing or decreasing the flow of fuel to said auxiliary burner in accordance with the position of said valve.

14. In a safety control and ignition apparatus for gas burning appliances having a main heating burner, a valve housing having a pair of ports one of which is in communication with said main heating burner, an auxiliary burner in communication with the other of said ports, a valve in said housing operatively associated with said ports for controlling the flow of fuel through one of said ports to said main burner and for regulating the flow of fuel through the other of said ports to said auxiliary burner, temperature responsive means responsive to the heat supplied by said auxiliary burner for actuating said valve, a constantly burning pilot for igniting said auxiliary burner, and means urging said valve away from one of said seats in opposition to movement of said valve away from the other of said seats by said temperature responsive means.

15. In a safety control and ignition apparatus for gas burning appliances having a main heating burner, a valve housing, a pair of ports one of which is in communication with said main heating burner, an auxiliary burner in communication with the other of said ports, a valve operatively associated with said ports, thermally actuated means responsive to the heat supplied by said auxiliary burner for actuating said valve, a constantly burning pilot in lighting proximity to said auxiliary burner, and resilient means acting in opposition to said thermally actuated means for regulating the flow of fuel through one of said ports to said auxiliary burner to maintain said thermally actuated means within predetermined limits of temperature when the other of said ports is uncovered by said valve.

16. In a safety control and ignition apparatus for gas burning appliances having a main heating burner, a pair of ports one of which is in communication with said main heating burner, an auxiliary burner in communication with the other of said ports, a valve within said housing operatively associated with said ports and normally closing the port communicating with said main burner, thermally actuated means responsive to the heat supplied by said auxiliary burner for moving said valve away from the said normally closed port and toward the other of said ports, means resiliently urging said valve toward the said normally closed port against the action of said thermally actuated means for regulating the flow of fuel through the said other port to said auxiliary burner to thereby maintain said thermally actuated means within predetermined limits of temperature when the said normally closed port is open, and a constantly burning ignition pilot in lighting proximity to said auxiliary burner.

17. In a thermostatic valve, a valve housing having a pair of axially aligned valve ports, means for controlling the flow of fuel to said housing, a valve head positioned between said ports and adapted to cooperate with said ports, a main burner in communication with one of said ports, an auxiliary burner in communication with the other of said ports, a constantly burning ignition pilot in lighting proximity to said main and auxiliary burners, thermally responsive means responsive to heat supplied by said auxiliary burner for actuating said valve head, and resilient means acting in opposition to said thermally responsive means for regulating the flow of fuel through the one port to said auxiliary burner, whereby fuel is continuously supplied to said main burner from the other of said ports as long as fuel is supplied to said valve housing.

18. A main burner and an auxiliary burner in communication with a thermally actuated valve, said valve comprising a housing having main and auxiliary outlet ports communicating with said main and auxiliary burners respectively, valve means mounted in said housing to cooperate with said ports to control the flow of fuel to said main burner and regulate the flow of fuel to said auxiliary burner when fuel is supplied to said housing, thermostatic actuating means responsive in its operation to the heat supplied by said auxiliary burner mounted to actuate said valve means, whereby said valve means upon actuation by said thermostatic actuating means may regulate the flow of fuel to said auxiliary burner, and a constantly burning ignition pilot in lighting proximity to said auxiliary burner.

In testimony whereof I affix my signature.

WALLACE J. SNOW.